United States Patent [19]

Greer

[11] 4,043,199

[45] Aug. 23, 1977

[54] LEVEL INDICATOR FOR GRANULATE STORAGE TANKS

[76] Inventor: James H. Greer, 239 Thisbe Ave., Cincinnati, Ohio 45233

[21] Appl. No.: 691,629

[22] Filed: June 1, 1976

[51] Int. Cl.² .............................................. G01F 23/00
[52] U.S. Cl. .................................... 73/290 R; 177/225
[58] Field of Search ................. 73/290 R, 290 B, 318, 73/321; 177/192, 225; 340/246, 247

[56] References Cited

U.S. PATENT DOCUMENTS

| 3,185,232 | 5/1965 | Iwasaki | 177/225 |
| 3,443,437 | 5/1969 | Skalka | 73/290 R |
| 3,697,708 | 10/1972 | Beresic | 340/246 X |

FOREIGN PATENT DOCUMENTS

| 53,211 | 4/1967 | Poland | 73/290 R |

*Primary Examiner*—Richard C. Queisser
*Assistant Examiner*—John S. Appleman
*Attorney, Agent, or Firm*—Walter S. Murray

[57] ABSTRACT

A level indicator for containers is disclosed that is adapted for use in granulate storage tanks and has a laterally collapsable sleeve disposed vertically within the tank for progressive embedment in the granulate as the tank is filled. The indicator also has a flexible, longitudinally contractile member freely hung inside, and coextensive with, the sleeve. A releasable means supports the contractile member within the sleeve and as granulate flows around and collapses the sleeve against the contractile member there is provided a sensing means adapted to support the free portion of the member upon operation of the releasable means. A scale means is associated with the sensing means to record the volume of granulate in the tank.

4 Claims, 4 Drawing Figures

LEVEL INDICATOR FOR GRANULATE STORAGE TANKS

The present invention relates to an improved displacement level indicator for containers such as storage silos or tanks adapted to house granular material such as manufactured plastic pellets, or grain, or stone, and the like.

It is the principal object of the invention to provide a relatively simple, trouble free and accurate level indicator device especially adapted for installations in tall storage containers for dry granulate.

Another object of the invention is to provide a novel depth measuring device which when energized will sense the level of granulate in a storage container, said level being translatable by a scale means to indicate the volume of material stored at any one time in the container.

A further object of the invention is to provide a level indicator that may be installed in existing silos or tanks in a minimum of time and susceptible of association with a plurality of different gauge means for showing the volume of granulate in said silos or tanks.

Other objects of the invention will be apparent from the following specification taken in conjunction with the accompanying drawings, wherein:

FIG. 2 is a view like FIG. 1 illustrating the condition level of my indicator device when the storage tank is partially filled with granulate.

Figure 3:
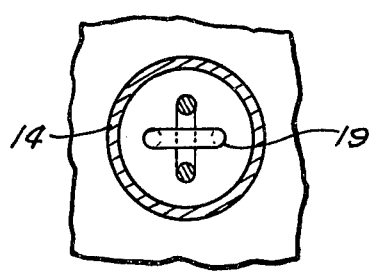
Figure 4:
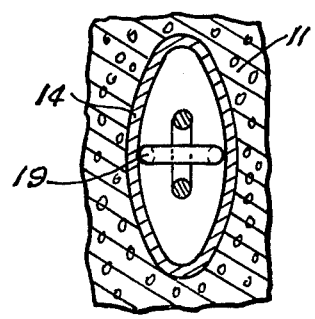

FIGS. 3 and 4 are enlarged sectional view taken on lines 3—3 and 4—4, respectively, of FIG. 2.

Figure 1:
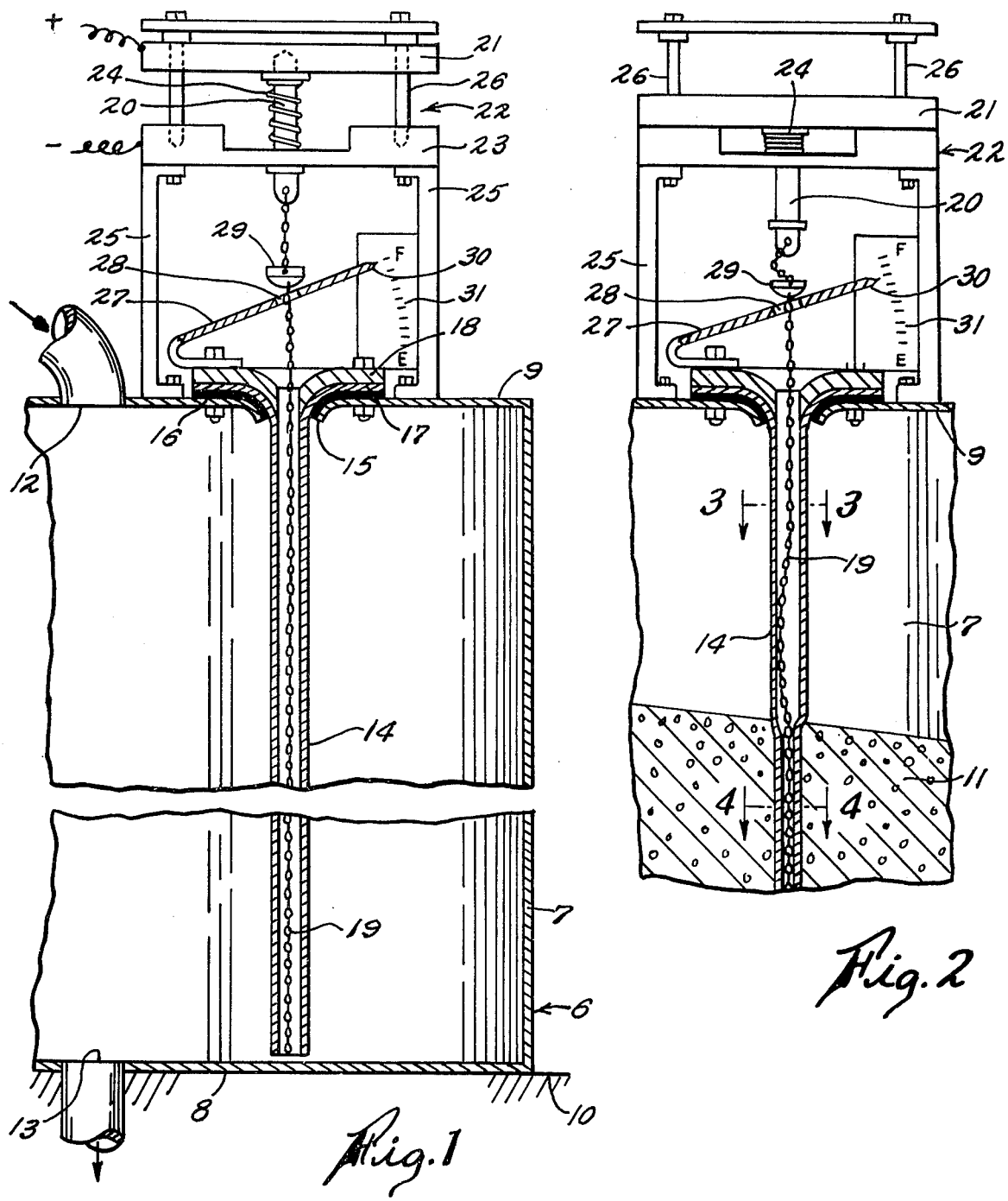
FIG. 1 is a fragmental, sectional view taken vertically through a conventional storage tank and showing my granulate level indicator in normal inoperative condition therein.

With particular reference to FIG. 1 of the drawings the numeral 6 indicates a tower-like structure, such as a conventional silo or tank 6 for the storage of granulate and having a cylindrical side wall 7, a bottom wall 8 and a roof 9, the structure usually rising about 80 feet above a base 10. Granulate 11 is introduced to the tank through an opening 12 in the roof 9 and is withdrawn, as required, through an exit opening 13 in the bottom 8 of the structure.

The level indicator device of this invention comprises an elongated, non-stretchable and collapsible sleeve 14 disposed wholly with the tank 6 and preferably supported by, and depending from, the roof 9 and having its lower terminal end in proximity to the bottom 8. The sleeve may be made of thin, NYLON or other plastic materials having the foregoing characteristics, or, in situations where much dust accumulates within the tank and there is danger of spontaneous conbustion, the sleeve may be made of stainless steel having a wall thickness of 0.007 in to 0.010 inch and grounded to the roof 9 of the tank to eliminate the possibility of creating static electricity with the device.

The means for mounting the sleeve 14 to the roof 9 of the tank comprises a hole 15 formed in the roof and provided with a downwardly flaring periphery, a flared upper end 16 on the sleeve, the interposition of a cushion 17 therebetween, and a mounting ring 18 bolted down upon the assemblage.

A flexible, longitudinally contractile member 19 is freely hung within the sleeve 14, and, as best shown in FIG. 1, is coextensive with the sleeve and normally out of contact with the interior surface of said sleeve. The member 19 is preferably a metal chain of loosely connected links which provide a member inherently capable of ready contraction in the direction of its longitudinal extension. The upper end portion of the member 19 extends above the open upper end of the sleeve 14 and is connected to and supported by a releasable means which may take the form of a rod 20 mounted on, and depending from, the vertically movable pole 21 of an electromagnet 22, said rod extending freely through an opening in the fixed pole 23 of the electromagnet. The poles are biased to normal opened position by a spring 24 which encircles the rod and bears against opposed faces of the said poles. The fixed pole 23 is mounted on legs 25 to the roof 9 of the tank while the movable pole 21 is guided for vertical movement by stems 26 mounted on the fixed pole 23.

A chain weight sensing means in the form of a depressable leaf spring 27 is fixed on the ring 18 and has an opening 28 to freely receive the chain, a stop 29 being mounted on the chain above the spring and normally out of contact with the upper surface of said spring. A scale means is associated with the spring 27 and may take the simplified form of a pointer 30 on the free end of the spring 27 that is referable to a dial 31 calibrated to record the volume of granulate in the tank.

In operation, when the tank is empty, as depicted in FIG. 1 of the drawings, the spring 24 on the releasable means will normally maintain the electromagnet poles 21 and 23 in spaced apart positions and the rod 20 in retracted position, said rod supporting the entire weight of the chain 19 disposed freely within the sleeve 14. As the tank fills with granulate 11, as indicated in FIGS. 2 and 4 of the drawings, granulate will flow around and press laterally against that portion of the sleeve embedded in the granulate. As best shown in FIG. 4 the pressure of the granulate will collapse the sleeve portion onto the chain portion up to the level of the granulate in the tank and hold that portion of the chain fast against the force of gravity.

To determine the level of granulate in the tank the electromagnet 22 is periodically energized which moves the rod 20 downwardly to the position shown in FIG. 2 of the drawings. Downward movement of the rod will bring the stop 29 on the chain into engagement with the spring 27 and the weight of the free slackened portion of the chain will be born by and depress the spring 27. The entire weight of the free slackened portion of the chain will depress the spring 28 a measurable amount and said amount will be recorded by the pointer on the dial 31 of a scale means. The translation of the dial reading to volume will record the amount of granulate in the tank at any predetermined time. Other scale means are contemplated such as a remotely located dial and associated pointer energized through a synchronous motor system with the spring 27, or like scale systems.

What is claimed is:

1. A device for indicating the level of flowable granulate in a storage tank, comprising a non-stretchable laterally collapsible sleeve disposed vertically within the tank for embedment in the granulate, a flexible, longitudinally contractile member freely hung inside and coextensive with the sleeve, a releasable means supporting the member within the sleeve, a weight sensing means adapted to support a portion of the member upon operation of the releasable means, and scale means associated with the weight sensing means to record the volume of granulate in the tank.

2. A device as set forth in claim 1 wherein the storage tank has a top, bottom and side walls, and the sleeve is mounted at is upper end fixed to the top wall and has is lower terminal end in proximity to the bottom wall, the contractile member is a chain of loosely connected links, and that portion of the sleeve embedded in the granulate is laterally collapsed and forced against the adjacent chain portion by the lateral pressure of the granulate.

3. A device as set forth in claim 2 wherein the upper end of the sleeve is open, the upper end of the chain extends through the said opening, and the releasable means is connected to the upper terminal end of the chain.

4. A device as set forth in claim 3 wherein the releasable means is an electromagnetic mounted upon the top of the tank, the weight sensing means is a spring support mounted upon the top and freely receiving the upper end of the chain, and a stop is secured to said chain portion normally positioned above the spring support, said stop being adapted to engage the spring support when the electromagnet is energized.

* * * * *